Sept. 24, 1968    J. V. FISHER    3,402,907

MOUNTING BRACKET

Filed Aug. 3, 1967

INVENTOR.
Julian V. Fisher

BY

His Att'ys

United States Patent Office 3,402,907
Patented Sept. 24, 1968

3,402,907
MOUNTING BRACKET
Julian V. Fisher, Carpentersville, Ill., assignor to Illinois Tool Works Inc., Chicago, Ill., a corporation of Delaware
Filed Aug. 3, 1967, Ser. No. 658,149
9 Claims. (Cl. 248—216)

ABSTRACT OF THE DISCLOSURE

A mounting bracket having spaced projections on its inner face to cooperate with mating recesses in a supporting wall by initial assembly of one projection with a corresponding recess and thereafter rotation of the bracket to align and lock another projection in a corresponding recess, and having means on the outer face thereof for reception and support of an elongate member, such as a retainer bar across the shelf-type recess of a refrigerator door.

---

This invention relates to a mounting bracket for the ends of strip-like members wherein the mounting bracket includes projections to cooperate with corresponding recesses in a supporting wall by initial assembly in one position and rotation to another position locking the bracket to the supporting wall.

An object of the invention is to provide a bracket of the above type which is easily and quickly mounted and which includes on its outer face means for quickly assembling and supporting a strip-like element.

Another object of the invention is to provide a supporting bracket of the above type wherein the bracket is resiliently urged against the supporting wall in assembled position with means to prevent accumulation of dust and the like between the inner surface of the bracket and the supporting wall.

A still further object of the invention is to provide a bracket of the above type including a resilient member projecting from the exposed face thereof to rapidly receive the elongate member by hand assembly and support the same against accidental removal, and looseness, but which permits removal of the elongate member by depression by hand of the resilient member.

The above and other objects of the invention will be part be obvious and will be hereinafter more fully pointed out.

Figure 1:
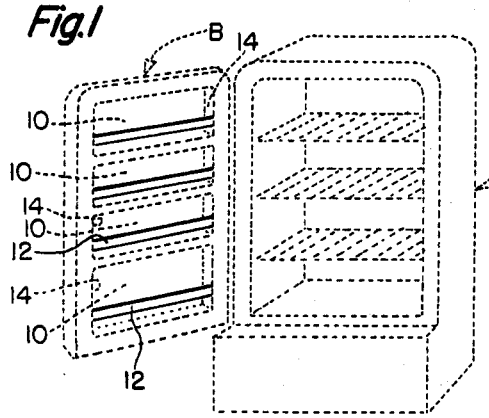
FIG. 1 is a perspective view of a refrigerator and its closure in open position showing the retaining bars across the closure recesses.

With reference to FIG. 1, there is shown a refrigerator A having a closure B with vertically spaced shelf-type recesses 10 each having a retainer bar extending across the front thereof. The opposite ends of each retainer bar 12 are mounted to opposite sidewall portions 14 of the closure across corresponding recesses. At least one end of each retainer bar is mounted to the wall portion by means of a bracket 16 (FIG. 4) or by a pair of such brackets mounted in opposite wall portions and adapted to face one another from opposite sides of each corresponding recess.

Figure 2:
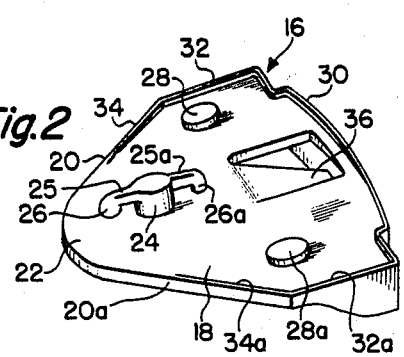
FIG. 2 is a perspective view showing the inner face of a mounting bracket.

In FIG. 2, the rear face of the plate-like portion 18 of the bracket 16 is illustrated. The plate-like portion 18 or base includes tapered edges 20, 20a forming an apex portion 22 centrally within which is mounted a projecting stud 24 having arms 25, 25a projecting oppositely therefrom and forming a generally T-shaped fastener element. The ends of the arms 25, 25a are provided with depending end portions 26, 26a projecting toward the adjacent surface of the plate-like portion 18. One or more lugs or button-like elements 28, 28a project from the inner surface of the base portion 18. As illustrated, these lugs 28, 28a are spaced equidistantly from the axis of the stud 24 in a triangular configuration therewith. However, the number and disposition of the lugs may be varied in accordance with complemental recesses formed in the supporting sidewall portions 14 as will hereinafter appear.

Along the edge of the base portion 18 opposite to the apex portion 22 there is provided a slightly upstanding narrow wall portion 30 merging with similar wall portions 32, 32a along adjacent sides of the base portion. These wall portions 32, 32a may incline slightly toward the apex portion to merge with additional wall portions 34, 34a, respectively, upstanding from the inclined edges 20, 20a, respectively, of the base portion. These latter wall portions 34, 34a incline downwardly to merge into the surface level of the base portion 18 short of the apex portion and generally transversely of the stud 24. The opposite or outer face of the base portion 18 (See FIGS. 3 and 4) is provided with an outwardly inclined resilient finger element 36 struck from the material thereof and projecting into close proximity with an upstanding wall portion 38 substantially normal to the base portion opposite to the apex portion. This wall portion 38 merges with sidewall portions 40, 40a along adjacent edges of the base portion. Lug portions 42, 42a project inwardly from the inner surface of the wall portion 38 adjacent the sidewall portions 40, 40a, respectively, with inclined surfaces directed toward the said sidewall portions.

Figure 3:
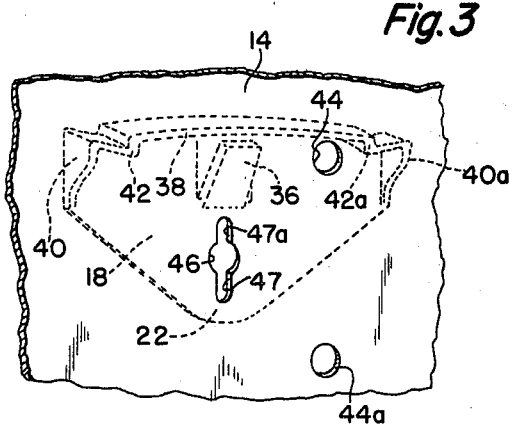
FIG. 3 is a view showing the initial position of a mounting bracket in phantom with respect to the supporting wall prior to its rotation to locked position.

With reference to FIG. 3 one of the supporting sidewall portions of the closure B is illustrated as including openings or recesses 44, 44a and a keyhole slot 46 arranged symmetrically with respect to the lugs 28, 28a and stud 24 on the supporting bracket. Thus, taking the bracket 16 illustrated in FIG. 2, it is placed in the dotted line position of FIG. 3 with the arms 25, 25a of the stud 24 registering with the slot portions 47, 47a of the keyhole 46. Pressure is applied to the outer surface of the bracket in the region of stud 24 to force the same inwardly and then the bracket is turned 90° clockwise to cause the end portions 26, 26a of the stud 24 to ride under the surface of the sidewall portion 14 so that the arms 25, 25a are stressed. Continued rotation to the position of FIG. 4 will align the lugs 28, 28a with the openings 44, 44a, respectively in the sidewall portion 14, into which they will snap for thus mounting the bracket to the sidewall portion. Similar assembly in the sidewall portion at the opposite end of each recess is effected by appropriate arrangement of the keyhole slot and the recesses for the bracket to be mounted thereto by clounterclockwise rotation. It is to be noted that the axis of the stud arms 25, 25a follow the longitudinal axis of the spring finger 26 toward the end of the apex portion 22. Thus in installed position, the stressed arms 25, 25a of the stud bear against the rear surface of the sidewall portion 14 and maintain the wall portions 30, 32, 32a 34, 34a in tight sealing relationship with the adjacent surfaces of the sidewall portion 14. With such stressed assembly, there is effective sealing against access of dust or spillage between the bracket and adjacent surface of the supporting sidewall for sanitary purposes and the opening below the finger may be plugged. It is to be noted that the end portion 26 of the arm 25 is under stress at a point within the apex portion 22 and that the end portion 26a of the arm 25a is under stress between the inclined wall portions 34, 34a. This provides an effective seal between the surface of the apex portion 22 and the sidewall surface as well as between the wall portions 34, 34a of the sidewall surface. In addition to the sealing effect, the stressed mounting of the bracket guards against looseness and rattling.

Figure 4:
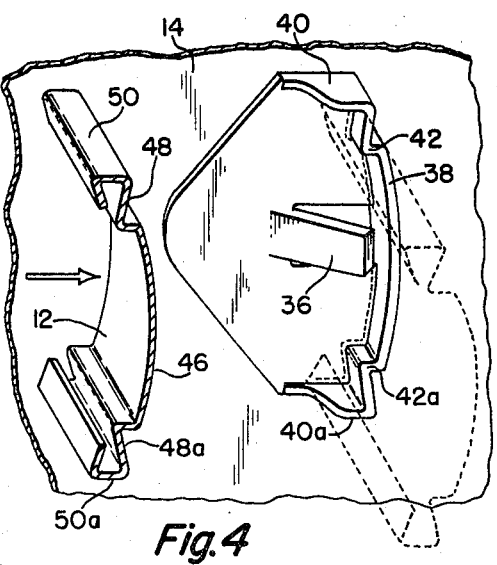
FIG. 4 is a view showing the position of the mounting bracket in locked orientation with a sectional fragment of the elongate member in full lines prior to installation and in phantom after installation.

As shown in particularly in FIG. 4, each retainer bar 12 includes a central portion 46 bowed slightly outwardly and terminating at the upper and lower edges thereof in recessed portions 48, 48a complementally shaped to the lugs 42, 42a respectively, on the wall portion 38. The upper and lower terminal edges 50, 50a of each retainer bar are shaped and rebent upon themselves and so that opposite end portions fit against the inner surfaces of the sidewall portions 40, 40a. Each retainer bar can be positioned in rear of the mounted brackets and urged in the direction of the arrow in FIG. 4 to installed positions. During such movement, the spring fingers 36 will be depressed and will then spring back to snugly engage the inner surface of the bowed portion 46. The retainer bar may be slightly stressed when assembled against lugs 42, 42a, and wall portions 38, 40, 40a and retained in such stressed position by the spring fingers 36. Here again, the assembly is maintained against looseness or rattling. It should be noted, however, that depression of the spring fingers 36 permits ready removal of the retainer bar for cleaning purposes.

Figure 5:
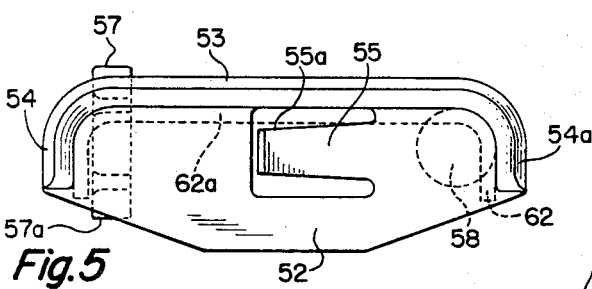
FIG. 5 is a view of the exposed surface of a modified form of mounting bracket.
Figure 6:
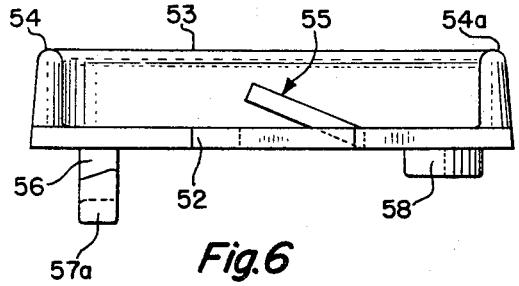
FIG. 6 is a side elevation of FIG. 5.
Figure 7:
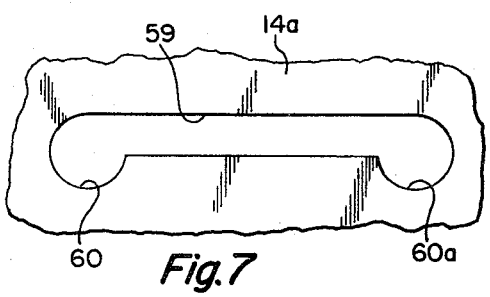
FIG. 7 is a view of the slot arrangement in a supporting wall for receiving the mounting bracket of FIGS. 5 and 6.

In the modified form of brackets shown in FIGS. 5 and 6, the body portion 52 is provided with an upstanding wall portion 53 terminating in short sidewall portions 54, 54a. A spring finger 55 is struck from the base portion with its axis extending generally parallel to the wall portion 53 and projecting from the outer face of the body portion. Projecting from one end of the inner surface of the body potrion 52 is a T-shaped fastener element 56 having arms 57, 57a. At the opposite end of the body portion 52 there is a button-like formation 58 projecting from the inner surface thereof. With this form of bracket, the side wall portion 14a of the refrigerator closure is provided with an elongated slot 59 terminating at opposite ends thereof in enlarged openings 60, 60a. To assemble the bracket, it is positioned with the T-shaped fastener 56 extending lenghthwise of the slot portion 59, then depressed and turned causing arms 57, 57a to engage under stress behind the wall surface 14a and shifted so that the button-like formation 58 will engage within one of the enlarged openings 60, 60a depending upon which side of the shelf-type recess the bracket is installed. When thus installed, a retainer bar 62 with its end portion 62a shaped to engage the inner surfaces of the wall portions 53, 54, 54a, is fitted in place by manually depressing the spring finger 55 to permit positioning of the retainer bar against the inner surface of the wall portions 53, 54, 54a and then released with the inclined edge 55a of the spring finger 55 to wedgingly engage the inner surface of the installed retainer bar for mounting the same in assembled position.

While certain forms of the invention have been shown for purposes of illustration, it is to be clearly understood that various changes in the arrangement of parts and details of construction may be made without departing from the scope and spirit of the invention as set forth in the appended claims.

I claim:

1. A bracket for supporting the ends of a strip-like member, and comprising: a base portion having a retaining wall projecting substantially normal to the outer face thereof along a portion of the periphery thereof and including retaining means for interengagement with the ends of a strip-like member, a locking stud member projecting from the inner face of the base portion remote from said retaining wall and having lateral arm means to engage the inner face of a supporting surface complementally apertured to receive the locking member and the arm means in a first position, lug means projecting from the inner surface of the base portion in spaced relation to the locking stud member and adapted to engage a complemental recess in the supporting surface when the bracket is rotated in a second position with the arm means frictionally engaged behind the inner face of the suporting surface, and the spring finger means projecting outwardly from the outer surface of the base portion and disposed closely adjacent said retaining wall for trapping the ends of an inserted strip-like member between the inner surface of said retaining wall and the adjacent surface of said spring finger means.

2. A bracket as claimed in claim 1, wherein the retaining means comprises angled wall means at the ends of said retaining wall along portions of the sides of said base portion.

3. A bracket as claimed in claim 1, wherein the retaining means includes lug formations projecting inwardly from the inner surface of said retaining wall to interfit with complemental formations on an installed strip-like member.

4. A bracket as claimed in claim 1, wherein the finger means extends toward the intermediate inner surfaces of the retaining wall to trap a strip-like member therebetween.

5. A bracket as claimed in claim 1, wherein the finger means extends substantially parallel to the inner surface of the retaining wall means with the adjacent edge thereof adapted to wedgingly trap a strip-like member.

6. A bracket as claimed in claim 1, wherein the base portion is generally triangular with an apical portion within which the stud member is located and wherein the lug means comprises a pair of lugs spaced from said stud member on the opposite sides of said finger means.

7. A bracket as claimed in claim 6, wherein narrow wall means project substantially normal to the inner surface of the major width of said base portion and along the sides thereof and including inclined portions merging with the surface level of the inner surface of said base portion on opposite sides of said stud member with the arm means adapted to be stressed in installed position to make a tight anti-loosening fit between the face of a supporting surface and the apical portion and the said wall means of the bracket.

8. A bracket as claimed in claim 7, wherein the arm means includes oppositely extending arms along a line substantially bi-secting base portion and with dependent end portions on said arms to increase the frictional engagement with the supporting surface when installed.

9. In combination with a support surface having a slot therethrough and a recess spaced from a predetermined point in the slot, the provision of a bracket to be rotatably assembled with the support surface by rotation thereof from a first position to a final position, said bracket having a base portion with a stud projecting normal to the inner face thereof and having lateral arm means thereon, said base portion also having a lug spaced from said stud and projecting normal to the inner face thereof, the stud and arm means registering with and passing through the said slot in said first position of the bracket with the lug out of registry with said recess, rotation of the bracket to said final position positioning the arm means in frictional engagement with the rear face of the support surface and with the lug in engaged registry with said recess, the outer surface of said bracket having a retaining wall projecting outwardly therefrom for receiving a strip to be supported, and resilient finger means projecting outwardly from the outer surface of the base portion in close proximity to said retaining wall in a position to engage a strip member located between the inner surface of the retaining wall and the adjacent portion of the finger means.

References Cited

UNITED STATES PATENTS

| | | | |
|---|---|---|---|
| 2,345,479 | 3/1944 | Johnson. | |
| 2,528,358 | 10/1950 | Grass | 248—251 |
| 3,180,606 | 4/1965 | Sabin et al. | 248—239 |
| 3,191,777 | 6/1965 | Willits | 211—87 |

CHANCELLOR E. HARRIS, *Primary Examiner.*

J. FRANKLIN FOSS, *Assistant Examiner.*